United States Patent [19]
Miesch

[11] 4,156,958
[45] Jun. 5, 1979

[54] RELEASABLE FASTENING

[75] Inventor: Hans Miesch, Zurich, Switzerland

[73] Assignee: Escher Wyss Limited, Zurich, Switzerland

[21] Appl. No.: 854,347

[22] Filed: Nov. 23, 1977

[30] Foreign Application Priority Data

Nov. 30, 1976 [CH] Switzerland .................. 15033/76

[51] Int. Cl.² ............................................. B21B 13/02
[52] U.S. Cl. ................................... 29/116 AD; 29/117
[58] Field of Search ............. 29/116 R, 116 AD, 117, 29/123, 125, 117, 148.4 D

[56] References Cited

U.S. PATENT DOCUMENTS

| 1,371,714 | 3/1921 | Warner | 29/117 |
| 3,900,913 | 8/1975 | Drumm | 29/117 X |
| 4,044,669 | 8/1977 | Luther | 29/117 |
| 4,069,569 | 1/1978 | Meckle et al. | 29/116 AD |

Primary Examiner—Dorsey Newton
Attorney, Agent, or Firm—Robert A. Ostmann

[57] ABSTRACT

Releasable fastening for fastening a body of revolution to a roll shell of approximately the same diameter, more particularly a ring on an elastic shell of a pressure equalization roll; in the corner which is formed by the wall of the roll shell and an end face of the body of revolution there is provided at least one compression-resistant element which is arranged to be capable of being pressed against the wall of the roll shell and against the end face of the body of revolution.

8 Claims, 4 Drawing Figures

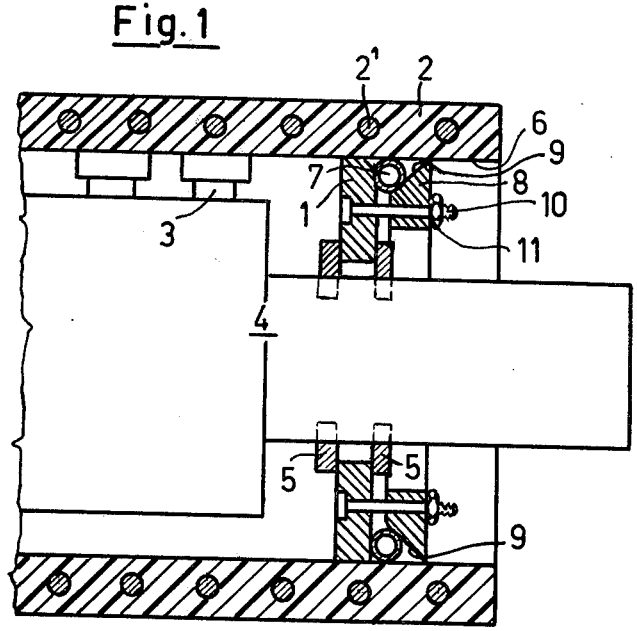
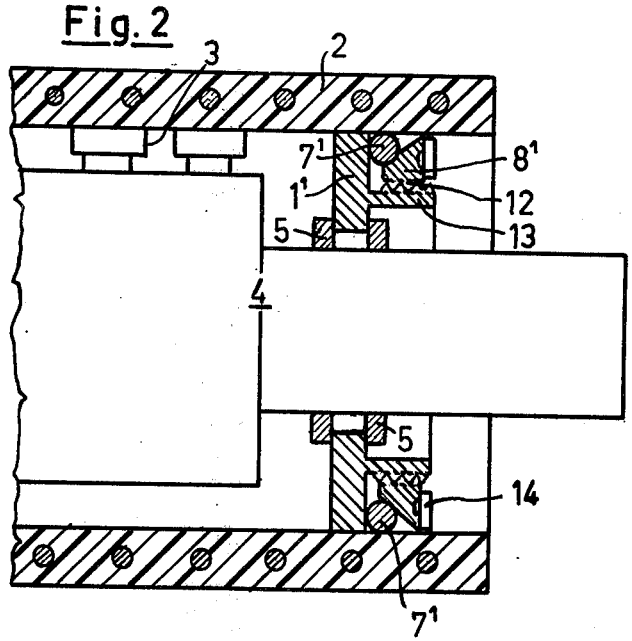

RELEASABLE FASTENING

BACKGROUND OF THE INVENTION

The invention relates to a releasable fastening for a body of revolution on a roll shell of approximately the same diameter, more particularly a ring on an elastic shell of a pressure equalisation roll.

A releasable fastening of this kind is used for example in a pressure equalisation roll. In pressure equalisation rolls there is provided a shell which is arranged to be capable of rotating about a stationary i.e., non-rotating supporting member and which bears on the supporting member by means of hydrostatic supporting elements. Advantageously, an elastic roll shell is often used, often a shell made of an elastomeric material. To guide the roll shell relatively to the supporting member it is usual to arrange a body of revolution, a guide ring within the roll shell, this guide ring being secured relatively to the roll shell so as to be capable of rotating therewith, and being guided on the supporting member. Under the action of the supporting elements bearing on the supporting member, the roll shell during operation of the pressure equalisation roll is subjected to considerable stress in the radial direction and in the axial direction relatively to the supporting member on which it is guided, and the fastening between the guide ring and the roll shell likewise. For constructional reasons, this fastening must be capable of being released. If there is an elastic, for example elastomeric, roll shell, it is also capable of being readily easily deformed at the region where the guide ring is fastened to the roll shell, and a fit between the surfaces of the ring and of the roll shell which come to abut when fastening is effected has a wide tolerance range for reasons of manufacture in the case of elastomeric roll shells. Thus, the two surfaces which come to abut are only approximately of the same diameter and usually there is a clearance between them, and of course there is no question of an interference fit because of resulting deformation of the elastic shell.

The constructional arrangements which have been used hitherto for such fastenings do not meet the requirements expected of them. The fastening slips, or the elastic roll shell is unallowably deformed in the radial and/or axial direction at the fastening region. In addition, hitherto known constructions have been complicated and expensive.

SUMMARY OF THE INVENTION

The present invention has as its object to provide a simple releasable fastening of the kind initially described which holds the body of revolution on the roll shell during operation in such a manner as to be secured against slipping through, is easy to disassemble, and the use of which allows the dimensions or deformations of more particularly an elastic roll shell in the region of the fastening to remain within what is allowable.

According to the present invention, this object is achieved in that in the corner which is formed by the wall of the roll shell and an end face of the body of revolution there is provided at least one compression-resistant element which is arranged to be capable of being pressed against the wall of the roll shell and against the end face of the body of revolution.

The fastening is reliable in operation and is resistant against slipping, and even an elastomeric roll shell is not deformed beyond allowable limits. Unavoidable deformation of the roll shell when the ring is fastened occurs within the wall of the shell and does not concern the surface of the shell.

In an advantageous constructional form, the compression-resistance element is a coil spring of round cross-section which is closed to form a spring ring and which abuts on the end face of the body of revolution and on the roll shell, and that a ring of conical configuration is provided which abuts on the said spring with its conical surface and which is adapted to be pressed in the direction towards the end face of the body of revolution.

It is advisable if the ring of conical configuration is guided and is adapted to be pressed towards the end face of the body of revolution by means of a few screws secured in the body of revolution.

BRIEF DESCRIPTION OF THE DRAWING

The subject of the present invention will be explained in detail with reference to drawings. Constructional examples of the invention are shown in a simplified form and in these drawings:

FIG. 1 shows a first constructional example,

FIG. 2 a second constructional example,

DESCRIPTION OF THE PREFERRED EMBODIMENTS

Figure 3:
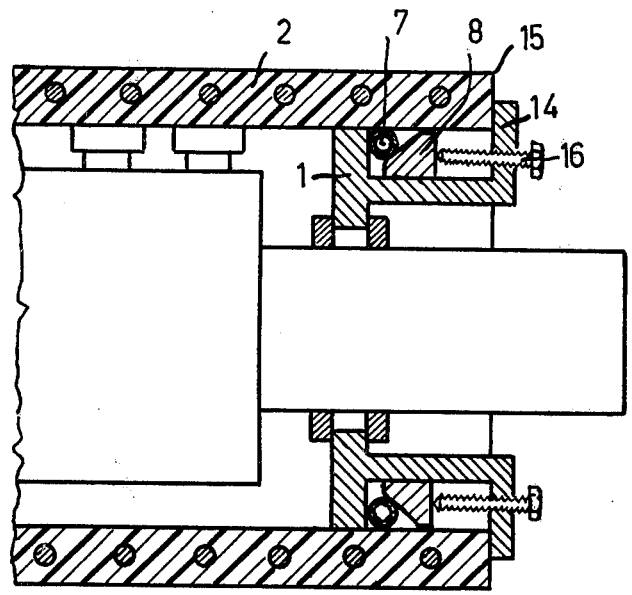
FIG. 3 a third constructional example, in a partial longitudinal sectional view in each case.

The illustrated releasable fastening of a body of revolution on a roll shell of approximately the same diameter concerns a ring which is in the form of a body of revolution, namely a guide ring 1 which is secured releasably relatively to a roll shell 2. The roll shell 2 is made of an elastomeric material and is reinforced by means of wires 2'. The roll shell 2 is adapted to be rotated about a stationary non-rotatable supporting member 4 and is supported on the supporting member 4 by means of supporting elements 3. Relatively to the supporting member 4, the roll shell 2 is guided by means of the guide ring 1 which is secured relatively to the said shell and which is guided on the supporting member 4 between two boundary rings 5 secured relatively to the supporting member.

In the corner which is formed by the wall, in this case the internal wall 6, of the roll shell 2 and an end wall of the guide ring 1 in the form of a body of revolution in the drawings this is the right-hand end wall there is provided a compression-resistant element 7 which is arranged to be capable of being pressed against the wall 6 of the roll shell 2 and against the end face of the guide ring 1.

The roll shell 2 and the body of revolution, the guide ring 1, are approximately of the same diameter.

The guide ring 1 which is in the form of a body of revolution fits into the roll shell 2 with a certain amount of play between its surface and the internal wall 6 of the roll shell 2.

The compression-resistant element 7 has a round cross-section. To press the element 7 against the end face of the guide ring 1 and the internal wall 6, there is provided at the said element 7 a wedge 8. The wedge 8 is guided on the guide ring 1 and presses with its wedging surface 9 against the element 7.

Figure 4:
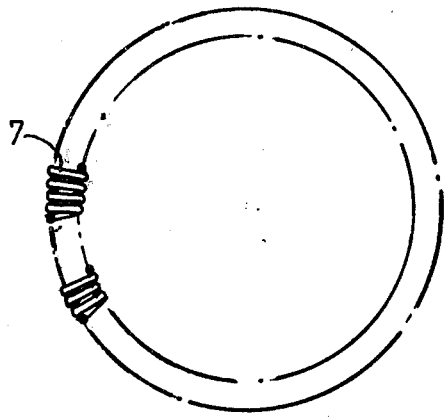
FIG. 4 shows a detail designated as 7 from FIG. 1 or FIG. 3 respectively in partial elevation.

As FIG. 4 shows particularly, the compression-resistant element 7 in FIG. 1 is a helical spring coiled from steel wire and closed to form an endless spring ring.

This spring ring is in abutment along the end face of the guide ring 1 and the roll shell 2.

The wedge 8 is a ring with a conical configuration and it abuts with its conical surface, the wedging surface 9 against the spring ring. It is capable of being pressed in the direction towards the end face of the guide ring 1, by means of a plurality of screws 10 secured in the guide ring 1. The screws 10 extend through the ring which is designated as 8 and is provided with the wedging surface 9. By turning nuts 11 the compression-resistant element 7 is pressed at the same time so securely against the end wall of the guide ring 1 and against the internal wall 6 of the roll shell 2 that it abuts on the two surfaces in such a manner that it is secure against slipping. It presses into the elastic roll shell 2 but only slightly, so that the external wall of the roll shell 2 is not deformed thereby.

In the other constructional example shown in FIG. 2 there is arranged distributed in the corner between a guide ring $1^1$ in the form of a body of revolution and an elastic roll shell 2, along the end face of the guide ring and the internal wall of the roll shell 2, a plurality of compression-resistant balls $7^1$. To press the balls against the end wall of the guide ring $1^1$ and at the same time against the internal wall of the roll shell 2, there is arranged at the balls $7^1$ a ring $8^1$ which has a conical configuration. The ring $8^1$ has a central aperture which is provided with a screwthread 12. This screwthread corresponds to a screwthread constructed on a projection 13 of the guide ring $1^1$ and guiding the ring $8^1$ with the screwthread 12. By turning the ring $8^1$ by means of a plurality of apertures 14 the balls $7^1$ are subjected to pressure and as a result the guide ring $1^1$ is secured relatively to the roll shell 2. The apertures 14 are constructed to be convenient for the insertion of a tool for turning the ring $8^1$.

In the constructional example shown in FIG. 3 the body of revolution 1 comprises a flange 14 which is secured relatively of the body of revolution 1 at the spacing from the end face of the said body. The diameter of the flange 14 is larger than the internal diameter of the roll shell 2. When the body of revolution 1 is pushed into the roll shell 2, the flange 14 comes to abut on the edge 15 of the roll shell 2. The spacing of the flange 14 from the end face of the body of revolution thus determines the desired precise position of the body of revolution within the roll shell 2. In the space between the end face of the body of revolution 1 and the flange 14 the spring ring 7 and the ring 8 with the conical configuration are arranged. To press the wedging surface of the ring 8 against the spring ring 7, to establish the fastening between the roll shell 2 and the body of revolution 1, there are provided a plurality of screws 16 which are arranged to extend through the flange 14.

The spring ring 7 is capable of expanding and can easily be fitted into the chamber between the end face of the body of revolution 1 and the flange 14. The ring is apertured at least at one region in order to allow the ring 8 of conical configuration to be positioned there.

It would be possible, to press the ring 8, to provide a plurality of pins extending through the flange 14 and operated simultaneously by means of a nut which would be seated on all the pins and guided on the flange 14.

The fastening according to the present invention is not limited simply to a body of revolution which is to be fixed within a roll shell. In a similar manner it would be possible to fasten a body of revolution to the external surface of a roll shell also.

I claim:
1. A releasable fastening for attaching an annular body to an elastic roll shell which has a comparable diameter and with a peripheral surface of which an end face of the body forms a corner which extends circumferentially around the axis of the shell, the fastening comprising
   a. a coil spring in the form of a ring located in said corner and having convolutions which bear directly on said peripheral surface of the shell and are compression resistant;
   b. wedging means carried by the annular body and having wedging surface means which abuts the convolutions of the spring ring and is inclined with respect to the shell axis; and
   c. screw threaded pressing means reacting between the annular body and the wedging means and serving to force the wedging means axially toward said end face of the body and cause the wedging surface means to press the convolutions axially against said end face of the body and radially against said peripheral surface of the shell,
   d. whereby the convolutions apply a multitude of uniform gripping forces which secure the shell to the annular body without distorting the shell or impairing concentricity between the shell and the body.

2. A releasable fastening as defined in claim 1 in which the coil spring is formed from a wire of round cross section.

3. A releasable fastening as defined in claim 1 in which
   a. the wedging means comprises a ring which is spaced axially from said end face of the body and is formed with a conical surface which defines said wedging surface means; and
   b. the pressing means comprises a series of circumferentially spaced, axially extending screw fasteners which interconnect the body and the ring.

4. A releasable fastening for attaching an annular body to an elastic roll shell which has a comparable diameter and with a peripheral surface of which an end face of the body forms a corner which extends circumferentially around the axis of the shell, the fastening comprising
   a. a series of compression resistant balls located in said corner and bearing directly on said peripheral surface of the shell;
   b. wedging means carried by the annular body and having wedging surface means which abuts the balls and is inclined with respect to the shell axis; and
   c. screw threaded pressing means reacting between the annular body and the wedging means and serving to force the wedging means axially toward said end face of the body and cause the wedging surface means to press the balls axially against said end face of the body and radially against said peripheral surface of the shell,
   d. whereby the balls apply a multitude of uniform gripping forces which secure the shell to the annular body without distorting the shell or impairing concentricity between the shell and the body.

5. A releasable fastening as defined in claim 4 in which
   a. the annular body has a cylindrical portion which projects axially from said end face and has a peripheral surface which is threaded; and b. the wedging means comprises a ring having a threaded peripheral surface which mates with the threaded surface of the cylindrical portion, and a conical surface which defines said wedging surface means, c. the mating threads of the ring and the cylindrical portion being effective to move the ring axially toward said end face of the body when the ring is turned in one direction relatively to the body, and thus serving as said pressing means.

6. A releasable fastening as defined in claim 4 in which a. the wedging means comprising a ring which is spaced axially from said end face of the body and is formed with a conical surface which defines said wedging surface means; and b. the pressing means comprising a series of circumferentially spaced, axially extending screw fasteners which interconnect the body and the ring.

7. A releasable fastening for attaching an annular body to an elastic roll shell which has a comparable diameter and with a peripheral surface of which an end face of the body forms a corner which extends circumferentially around the axis of the shell, the fastening comprising a. a circumferential series of spaced gripping elements located in said corner and bearing directly on said peripheral surface of the shell, the elements having round shapes in axial cross section and being compression resistant so that said round shapes are maintained when the elements are loaded in compression;

b. a cylindrical portion on the annular body which projects axially from said end face and terminates with a flange at its free end which abuts an end of the shell;

c. a ring mounted on and guided by the cylindrical portion and having a conical surface which engages the gripping elements; and d. screw threaded pressing means reacting between the flange and the ring and serving to force the ring toward said end face of the annular body and cause the conical surface to press the gripping elements axially against said end face of the body and radially against said peripheral surface of the shell, e. whereby the gripping elements apply a multitude of uniform gripping forces which secure the shell to the annular body without distorting the shell or impairing concentricity between the shell and the body.

8. A releasable fastening as defined in claim 7 in which the pressing means comprises a circumferential series of axially extending threaded fasteners which pass through the flange and bear against the ring.

* * * * *